UNITED STATES PATENT OFFICE.

ERNST BODMER, OF BASEL, SWITZERLAND, ASSIGNOR TO THE FIRM OF DYE-WORKS FORMERLY L. DURAND, HUGUENIN & CO., OF BASEL, SWITZERLAND.

GREEN MORDANT DYESTUFFS AND PROCESS OF MAKING SAME.

1,106,185.  Specification of Letters Patent.  Patented Aug. 4, 1914.

No Drawing.  Application filed July 3, 1913. Serial No. 777,349.

*To all whom it may concern:*

Be it known that I, Dr. ERNST BODMER, chemist, a citizen of the Swiss Republic, and resident of Basel, Switzerland, have invented new and useful Green Mordant Dyestuffs and a Process of Making Same, of which the following is a full, clear, and exact specification.

In United States Letters Patent No. 1003257 is described a process whereby amino-meta-oxybenzoylbenzoic acids having substituents in the amino group can be condensed with a pyrogallolsulfonic acid to sulfonated rhodols corresponding probably to the general formula

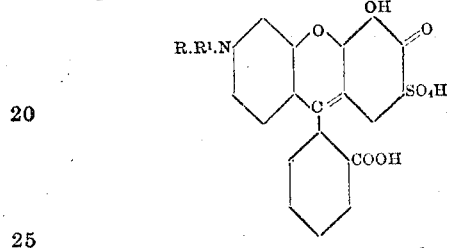

wherein R stands for a neutral monovalent organic radical, as for instance, an alkyl, aryl or aralkyl group and $R^1$ for a neutral monovalent radical, as for instance, hydrogen or an alkyl, aryl or aralkyl group.

According to the present invention new, valuable mordant dyeing dyestuffs are obtained by treating the said sulfonated rhodols with fuming sulfuric acid, chlorsulfonic acid or like agents adapted to eliminate or split off water. These dyestuffs, in so far as they do not contain sulfonic groups elsewhere than in the pyrogallol nucleus, are of basic character and their salts are soluble in water, the solutions yielding precipitates on addition of alkalis. The sulfonic group in the pyrogallol nucleus appear to be eliminated. The new products are of particular interest for cotton printing. With chrome mordants some of them yield beautiful green tints which are remarkably fast. They can also be printed with tannin. The tints thus obtained are likewise green. As compared with coerulein, by means of which only olive tints can be obtained, the new products have a valuable greener tint and, what is most important, a better solubility.

The dyestuffs of British specification No. 10732 of 1912 yield with chrome mordants blue-green to blackish green tints and blue lakes with tannin; the products made by this invention yield, on the other hand, valuable green tints both with chrome mordants and when printed with tannin. The new products must therefore have a constitution different from that of the products of the last named specification. In the form of their salts the new dyestuffs correspond probably to the formula:

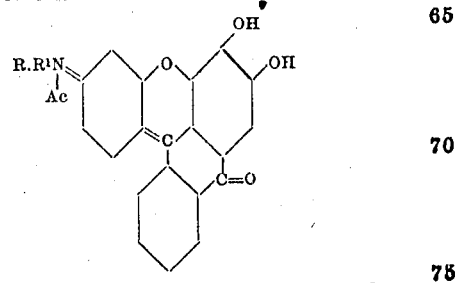

wherein R stands for a neutral monovalent organic radical, as for instance, an alkyl, aryl or aralkyl group and $R^1$ for a neutral monovalent radical as for instance hydrogen or an alkyl, aryl or aralkyl group and Ac for an acid negative ion.

The following examples illustrate the invention, the parts being by weight:

Example I: 1 part of the sulfo-rhodol obtained from diethyl-amino-meta-oxybenzoyl-benzoic acid and pyrogalloldisulfonic acid, is stirred with 4 parts of fuming sulfuric acid containing 20–25 per cent of $SO_3$ and the solution obtained is heated to 150–155° C. This temperature is maintained until a sample diluted with water yields a pure green color and contains no insoluble particles which are soluble in ammonia to a red solution. When this stage has been attained the mass is set aside to cool and then diluted with ice-water. The greater part of the new dyestuff is in solution, but can be salted out. The product is filtered, the solid dissolved in water containing a little hydrochloric acid and this solution filtered from a small amount of insoluble matter. The filtrate is mixed with solution of sodium carbonate or sodium acetate, whereupon the dyestuff is precipitated in the form of green flocks. It is again separated by filtration, dissolved in dilute hydrochloric acid and salted out. The dyestuff thus obtained is a black powder which dissolves in water to a green solution and may be precipitated from this solution by means of alkalis. In concentrated sulfuric acid it dissolves to a reddish brown solution which becomes green on addition of water.

The product dyes chrome mordanted wool powerful green tints fast to fulling and to light. When printed with chrome mordants on cotton, it yields green tints of excellent fastness to washing, soap, chlorin and light. The prints with tannin are also green and of good fastness. In quite similar manner a corresponding dimethyl-derivative may be obtained; it exhibits like properties but its chromium lake is somewhat more intense in color and more bluish.

Example II: 1 part of the dyestuff obtained from diethyl-amino-meta-oxybenzoyl-benzoic acid and pyrogalloldisulfonic acid is stirred with 4 parts of chlorsulfonic acid and the solution thus obtained is heated to about 140°–145° C. until a sample diluted with water becomes green and there are no longer present particles which dissolve to a red solution in ammonia. The product is worked up in the manner described in Example I.

The invention differs from that described in British specification No. 10732 of 1912 in that it is essential that the parent material should be necessarily a sulfonated rhodol and in that a stronger fuming sulfuric acid is used. In the case of the present invention it is necessary to use fuming sulfuric acid of concentration sufficient to insure that there is enough sulfuric anhydrid present to combine with all the water which is formed. If too weak a fuming sulfuric acid, or sulfuric acid monohydrate or ordinary concentrated sulfuric acid of 96 per cent. strength is used, other products are formed which dissolve in water to a more blue solution and yield bluer, less valuable tints. Such other products are identical with or very similar to the dyestuffs obtained according to British specification No. 10732 of 1912. For instance when the process described in Example I of that British specification 10732 of 1912 is applied to a sulfonated rhodol, that is to say if the latter is treated with concentrated sulfuric acid of 96 per cent. strength, a product is formed which dissolves in water to a blue solution. It is presumed that the sulfonic group is eliminated from the rhodol in this case before the condensation (elimination of water), while when sufficiently strong fuming sulfuric acid or chlorsulfonic acid is used the sulfonic group is eliminated simultaneously with or immediately after the condensation (elimination of water).

If the foregoing Example I be applied to a nonsulfonated rhodol, that is to say, if the latter be treated with fuming sulfuric acid containing about 25 per cent. of $SO_3$, there will be formed a product which dissolves in water to a blue solution. The dyestuff which dissolves in water to a green solution can be obtained only from the sulfonated rhodol and by using sufficiently strong fuming sulfuric acid or chlorsulfonic acid, and would obviously be produced also by first sulfonating the non-sulfonated rhodol and afterward subjecting it to condensation (elimination of water).

Since, therefore, the condensation (elimination of water) of the sulfonated or non-sulfonated rhodols according to British specification No. 10732 of 1912 and that of the sulfonated rhodols according to the present invention, lead to different products, both of which are free from sulfur, the products must be of different nature, that is to say, the mechanism of the reaction must differ in the two cases, occurring at different positions in the molecule.

The difference between the dyestuffs of British specification No. 10732 of 1912 and the corresponding products of the present invention is expressed in the following table of comparisons:

| | Dyestuff from— | |
| --- | --- | --- |
| | Diethylamino-meta-oxybenzoyl-benzoic acid and pyrogallolsulfonic acid, treated with fuming sulfuric acid containing 25 per cent. of $SO_3$. | Diethylamino-meta-oxybenzoylbenzoic acid and pyrogallol, treated with concentrated sulfuric acid. |
| Color of the aqueous solution of the hydrochlorid. | Green, can be precipitated in green flocks by alkalis. | Blue, can be precipitated by alkalis in green flocks. |
| Color of the solution in concentrated sulfuric acid. | Brown with a tinge of red, becomes green on addition of water. | Brownish yellow, becomes blue on addition of water. |
| Color of the solution in glacial acetic acid. | Pure green. | Blue. |
| Color of the solution in alcohol. | Pure green. | Blue. |
| Color of the solution in amylalcohol. | Pure green. | Blue. |
| Color of the solution in nitrobenzene. | Pure green. | Blue green. |
| Color of the solution in pyridin. | Pure green. | Blue green. |
| Color of the solution in anilin. | Green, crystallizes therefrom in needles unchanged. | First blue-green then green, reacts with anilin to form a new body which crystallizes in tables and dissolves in concentrated sulfuric acid to a blue green solution; whereas the original product dissolves in concentrated sulfuric acid to a brown-yellow solution. |

What I claim is:
1. The described process for the manufac- ture of green mordant dyestuffs by treating the sulforhodols resulting from the condensation of a pyrogallolsulfonic acid with an aminometaoxybenzoyl-benzoic acid substituted in the amino group, with an agent capable of eliminating or splitting off water, containing at least a sufficient quantity of sulfuric anhydrid to combine with all the water which is formed during the treatment.

2. The process for the manufacture of green mordant dyestuffs by treating the sulforhodols resulting from the condensation of a pyrogallolsulfonic acid with an aminometaoxybenzoyl benzoic acid substituted in the amino group with a fuming sulfuric acid of concentration sufficient to insure that there is during the treatment enough sulfuric anhydrid present to combine with all the water formed.

3. The process for the manufacture of green mordant dyestuffs by treating the sulforhodols resulting from the condensation of a pyrogallolsulfonic acid with an amino metaoxybenzoyl-benzoic acid substituted in the amino group with fuming sulfuric acid containing 20-25 per cent. of sulfuric anhydrid.

4. As new products, the described green dyestuffs derived from the violet dyestuffs which result from the condensation of a pyrogallolsulfonic acid with an aminometaoxybenzoyl-benzoic acid substituted in the amino group, corresponding probably to the formula

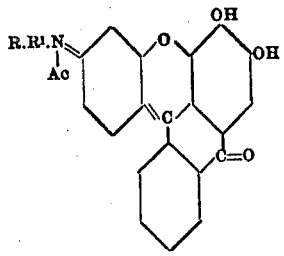

wherein R stands for a neutral monovalent organic radical, $R^1$ for a neutral monovalent radical and Ac for an acid negative ion constituting black powders which dissolve in water to green solutions from which the dyestuffs may be precipitated by an addition of alkali, in concentrated sulfuric acid to reddish brown solutions becoming green on addition of water, in glacial acetic acid, alcohol, amylalcohol, nitrobenzene and pyridin to pure green solutions and in anilin to green solutions from which the dyestuffs crystallize unchanged, giving, when printed on cotton with chrome mordants or tannin, valuable green tints of excellent fastness to washing, soap, chlorin and light and dyeing chrome mordanted wool powerful green tints fast to fulling and light.

In witness whereof I have hereunto signed my name this 24th day of June, 1913, in the presence of two subscribing witnesses.

Dr. ERNST BODMER.

Witnesses:
  Geo. Gifford,
  Amand Ritter.